May 1, 1962 I. Y. LAKE ETAL 3,032,174
MATERIAL CONVEYING APPARATUS
Filed Jan. 2, 1958 3 Sheets-Sheet 1

INVENTORS
IRVING Y. LAKE
FREDERICK H. CLYMER
BY
Lindsey and Prutzman
ATTORNEYS

May 1, 1962     I. Y. LAKE ETAL     3,032,174
MATERIAL CONVEYING APPARATUS
Filed Jan. 2, 1958     3 Sheets-Sheet 2
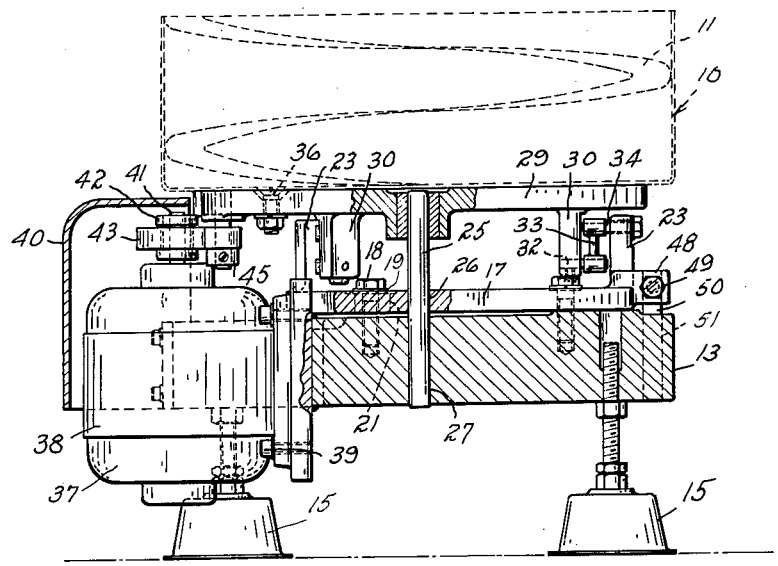
FIG.3
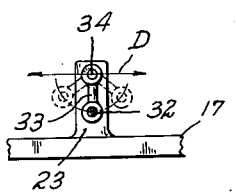
FIG.4
FIG.5
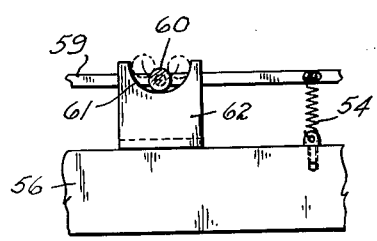
INVENTORS
IRVING Y. LAKE
FREDERICK H. CLYMER
BY
Lindsey and Prutzman
ATTORNEYS May 1, 1962 I. Y. LAKE ETAL 3,032,174
MATERIAL CONVEYING APPARATUS
Filed Jan. 2, 1958 3 Sheets-Sheet 3

INVENTORS
IRVING Y. LAKE
FREDERICK H. CLYMER
BY
Lindsey and Prutzman
ATTORNEYS

United States Patent Office 3,032,174
Patented May 1, 1962

3,032,174
MATERIAL CONVEYING APPARATUS
Irving Y. Lake, Terryville, and Frederick H. Clymer, Bristol, Conn., assignors to Arthur G. Russell Co., Inc., Forestville, Conn., a corporation of Connecticut
Filed Jan. 2, 1958, Ser. No. 706,712
11 Claims. (Cl. 198—220)

This invention relates to material conveying apparatus and more particularly to vibratory apparatus for conveying material along an inclined surface.

In one type of conveying apparatus for conveying discrete material such as machine parts, etc. from a hopper to a point of delivery in a continuous and uniformly spaced stream, the material conveying is accomplished by oscillating the hopper in a path having vertical and horizontal components. Generally, the hopper contains an inclined conveying surface which is preferably helical in form and when the hopper is oscillated the parts are oriented along the surface in single file relationship and conveyed to a destination adjacent the end of the surface. In prior designs, the construction of such apparatus has been extremely bulky and complicated as well as being subject to improper spacing and misalignment of the conveyed parts primarily due to excessive vibration of the apparatus as well as various design factors. Furthermore, as many of these conveyors employed a spring suspended hopper, the constantly changing weight of the material in the hopper as the hopper is emptied produced a variable hopper motion with resulting improper feeding.

Accordingly, it is an object of the invention to provide a new and improved conveying apparatus for parts and the like in which the parts are conveyed to a destination in a smooth, aligned and substantially uniform manner regardless of the weight of material in the hopper.

It is another object of the invention to provide an improved conveying apparatus having a hopper supported without the use of springs and which oscillates in a curvilinear path and whose operation is substantially constant at all times during the conveying operation.

It is a further object of the invention to provide a new and improved conveying apparatus which is inexpensive to manufacture, simple in construction, and utilizes materials which are readily available or can be readily fabricated.

It is a still further object of this invention to provide an improved conveying apparatus which is capable of rapid and simple adjustment over a wide range material conveying speed, direction and spacing.

Other objects will be in part obvious, and in part pointed out more in detail hereinafter.

The invention accordingly consists in the features of construction, combination of elements and arrangement of parts which will be exemplified in the construction hereafter set forth in the scope of the application of which will be indicated in the appended claims.

The invention is illustrated in the accompanying drawings, wherein:

FIG. 3 is a side view partially in section of the apparatus of FIG. 1;

FIG. 4 is a fragmentary view of the hopper supporting arrangement of the invention;

FIG. 5 is a fragmentary view of the hopper supporting portion of a modified form of the invention;

Figure 1:
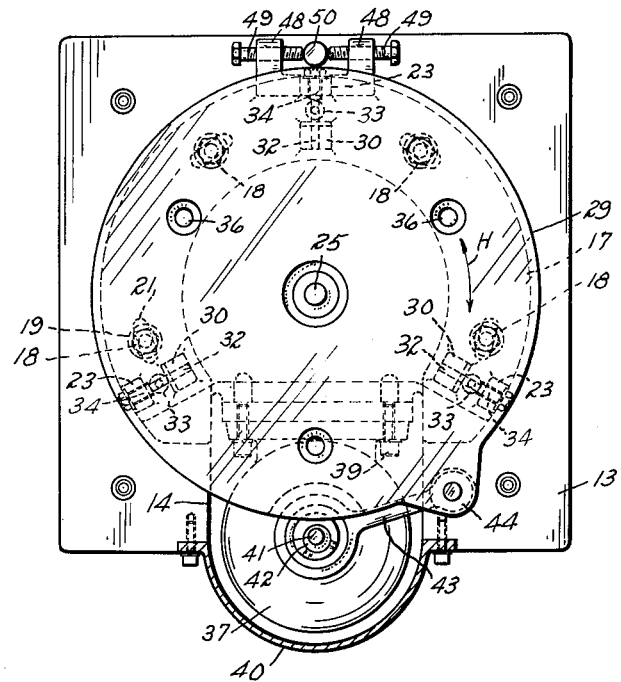
FIG. 1 is a plan view of a conveying apparatus embodying the invention.
Figure 2:
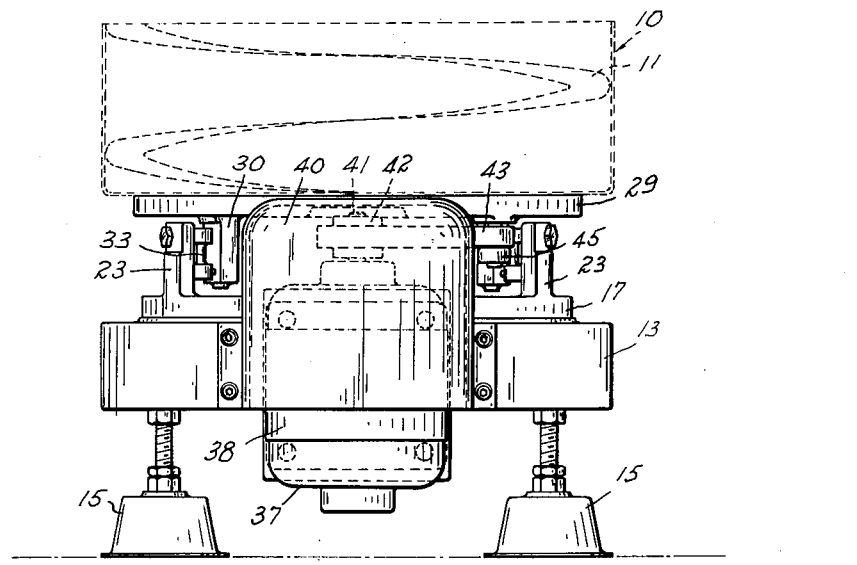
FIG. 2 is an end view partially in phantom of the apparatus of FIG. 1.

There is shown in FIGS. 1–3 a material conveying apparatus of the vibratory type which incorporates an embodiment of this invention and which utilizes a container or hopper 10 into which the parts to be conveyed are placed. For example, material such as bolts, washers, caps, etc. are readily conveyed in the desired manner with this type of apparatus. The hopper 10 contains an inclined conveying surface or ramp 11 fixed suitably to the inner wall of the hopper 10 so as to extend helically thereon and form the conveying surface on which the material in the hopper will move. Preferably, the helical ramp is provided with a suitable track or groove (not shown) which receives a portion of the parts to be conveyed and thus orients or aligns these parts as they are moved along the surface. It should be understood that the hopper shown is illustrative and may be of any conventional design presently used which is arranged to be oscillated continuously in a path having vertical and horizontal components so as to move the parts in the hopper along the conveying surface.

The conveying apparatus consists of a rectangular supporting means or base 13 containing a recessed portion 14 along one side thereof. The base 13 is supported on a plurality of adjustable legs 15.

On the upper surface of the base 13, there is provided an adjusting plate 17 preferably circular and centrally positioned thereon. The plate 17 is secured to the base by means of a plurality of bolts 18 and washers 19. The shanks of the bolts 18 pass through arcuate slots 21 in the plate 17 as shown best in FIG. 1 which permit the plate to be adjustably rotated when the bolts 18 are released from holding engagement therewith.

The plate 17 is also provided with a plurality of upstanding posts 23 along its marginal edge portion. Preferably there are three of these posts 23 located at spaced intervals as shown in FIG. 1.

The plate 17 is coaxially positioned on the base 13 by means of a vertically extending guide shaft 25 which passes through central bores 26 and 27 in the plate 17 and base 13, respectively, and is suitably fixed to the base 13. The plate 17 is freely rotatable on the guide shaft 25 as well as the central portion of a hopper table 29 which carries the hopper 10. As can be seen, the upper end of shaft 25 is suitably journaled within the table 29.

In order to support the hopper table 29, the table is provided with a plurality of integral legs 30 depending from the underside of the table and positioned in substantially the same spaced relationship at the posts 23 on the adjusting plate 17.

The lower end of each of the legs 30 is suitably bored to fixedly receive a pin 32 which is journaled at its other end to the lower end of a connecting arm 33. The arm 3 may be composed of any suitable rigid material but is preferably formed of a semi-rigid plastic material such as nylon so as to minimize wear. The upper end of the arm 33 is pivotally connected to a supporting pin 34 which is rigidly mounted within the upper portion of the post 23. It should be understood that each of the hopper table legs 30 are connected in a similar manner to the post 23 with which it is associated. Thus the hopper table 29 is movably supported on arms 33 which swing in unison from the pins 34. It can be seen that the hopper 10 is removably mounted on the top of the table 29 by means of a plurality of bolts 36 so that the hopper 10 is moved with the table.

In order to drive the hopper table 29, there is provided driving means comprising an electric motor 37 positioned within the base recess 14 and secured to the base by means of a strap 38 and bolts 39. There is also provided a cover 40 for the motor 37 which is also suitably secured to the base 13. The motor 37 contains a shaft 41 on the upper end of which is mounted an eccentric 42. The eccentric 42 is journaled within one end of a connecting arm 43, the other end of which is pivotally pinned to a peripheral ear 44 on the hopper table 29. A lock nut 45 is employed to secure this arm end to the table. Thus it can be seen that when the shaft 41 of the motor 37 is rotated the throw of the eccentric 42 will move the arm 43 reciprocally to rotate the hopper table 29 within a small angular path as indicated by the double arrow H in FIG. 1.

As described above, the hopper table 29 is arranged to rotate on the guide shaft 25 and each of the arms 33 pivot around pin 34 to guidedly direct the movement of the hopper table 29 and hopper 10. The pin 32 at the lower end of the arm therefore moves along a segment of a circular path as shown in FIG. 4 during the rotation of the table 29 so that the hopper is oscillated continuously along this segment. The hopper table 29, therefore, moves vertically along the guide shaft 25. Thus, the movement of the table 29 and hopper 10 connected thereto describes an endless curvilinear path due to the oscillations produced by the motor eccentric arm 43 and the swing of the arms 33.

In a manner well known in conveying apparatus of the type described above, this will feed the material up the helical conveying surface 11 in a continuous and uniform stream to a selected destination. If desired, the motor 37 may be a variable speed motor or linkages so as to drive the hopper 10 at any selected speed. The amplitude of vibration may also be made adjustable by providing an adjustable throw eccentric on the hopper drive. Furthermore, the helical conveying surface 11, may be positioned to rise in either a clockwise or counterclockwise direction.

By mounting the plate 17 so that it may be rotatably positioned, an adjustment has been provided by which the oscillating movement of the hopper 10 may follow a selected segment of the arcuate path shown by the dotted line in FIG. 4 and thus vary the proportion of vertical movement to horizontal movement. For a fine adjustment of the plate position, and to facilitate adjustment while the machine is in operation, there is provided a yoke 48 which is preferably integrally formed on the peripheral edge of the guide plate 17 as shown in FIGS. 1, 3. A pair of axially movable adjusting screws 49 are threadedly received within appropriate openings in the outer end of each of the yoke legs and have their opposed ends arranged to clamp a vertically extending rod 50. This rod 50 is fixedly mounted within a recess 51 in the base 13 as shown in FIG. 3 and by adjustably positioning the adjusting screws 49 when the holding bolts 18 are released, the yoke and consequently the guide plate 17 may be rotated to a selected fixed position within an arcuate range as defined by the bight of the yoke 48.

As can be seen, the motor eccentric arm 43 being pinned to the hopper table ear 44, the hopper table 29 is held against rotation with respect to this arm during this adjustment. Thus, when the guide plate 17 is rotated carrying with it the posts 23, the arm support pins 34 are moved within a horizontal plane parallel to the guide plate 17 a selected distance in either direction as shown by the double arrow D in FIG. 4. This position of pin 34 will therefore move the pivotpoint of the arm 33 and thus determine the segment of the dotted line arcuate path of FIG. 4.

Figures 6, 7:
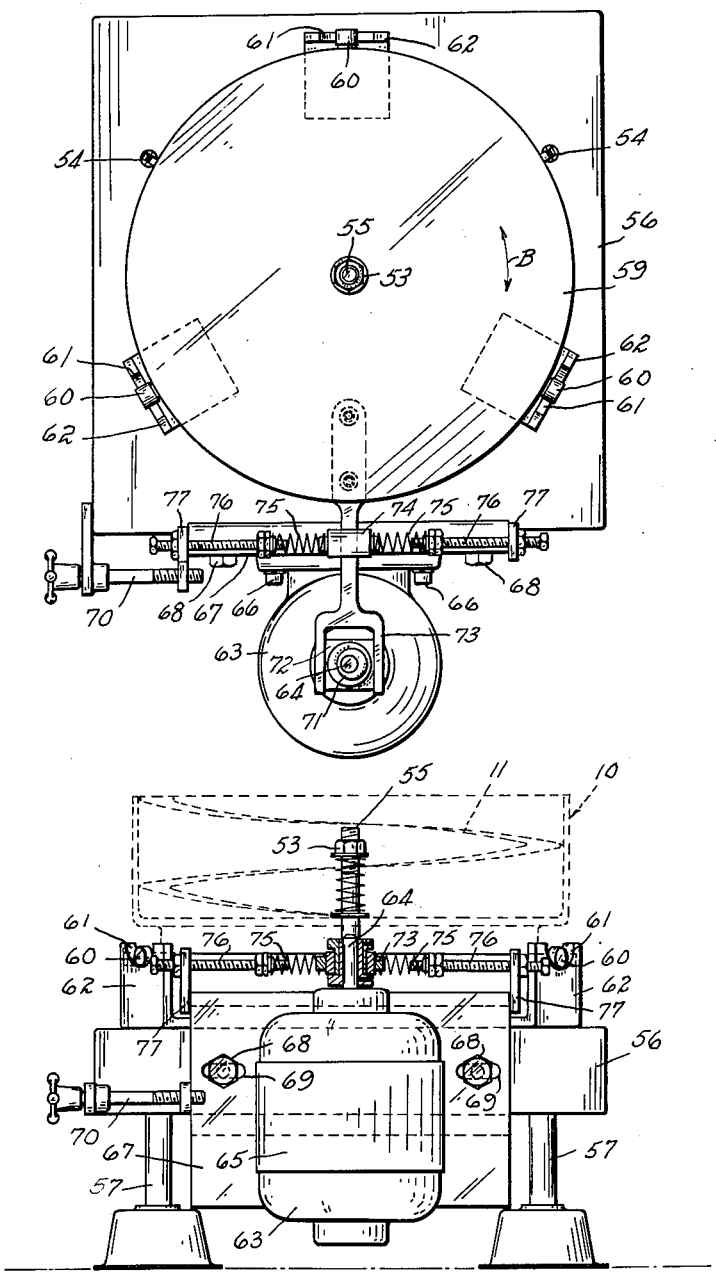
FIG. 6 is a plan view of a modification of the apparatus of the invention.
FIG. 7 is an end view partially in phantom of the modification of FIG. 6.

There is shown in FIGS. 5–7, a modification of the conveying apparatus. In this modification, the hopper 10 containing the helical conveying surface 11 is supported on a table 59 and both the hopper and table are journaled on a central shaft 55 extending through the hopper bottom wall and the table and fixedly attached at its lower end to a base 56 which is supported on a plurality of adjustable legs 57. The hopper and table are resiliently loaded downwardly by means of a spring 58 positioned around the shaft and may be adjustably tensioned by means of a nut 53.

On the peripheral edge of the hopper table 59 are mounted a plurality of uniformly spaced cam followers or rollers 60. Preferably, three of these rollers are used in the embodiment of FIGS. 5–7. These rollers 60 are arranged to ride in arcuate grooves or recesses 61 formed within the upper edge of posts 62 extending upwardly from the upper surface of the base 56. Thus, the spring 58 through which the hopper shaft 55 extends loads the rollers 60 into continuous contact with the arcuate grooves 61 to support the hopper 10 and hopper plate 59. There is also provided a plurality of springs 54 as shown in FIGS. 5 and 6 connected between the hopper table 59 and base 56 which also retain the rollers 60 within grooves 61.

The driving means for the hopper 10 comprises a motor 63 which is secured by means of a strap 65 and bolts 66 to a slidable plate 67 supported along one side of the base 56 by means of bolts 68. The plate 67 preferably contains slots 69 through which the bolts 68 extend to permit the plate to be moved in a horizontal plane when the bolts are released. The plate 67 may be adjustably moved while the machine is in operation by means of an adjusting screw 70 threadably connected therewith and supported on the base 56.

An eccentric 71 is secured to the upper end of motor shaft 64 and is journaled within a bearing 72 which is supported within the U-shaped end or yoke of an arm 73 the other end of which is suitably connected to the underside of the hopper table 59. Intermediate the ends of the arm 73 there is attached a spring seat 74 engaged on opposite sides by a pair of damping springs 75. The other ends of these springs 75 are supported on adjusting screws 76 mounted on brackets 77 arranged on opposite sides of the motor support plate 67.

In the operation of the modification of FIGS. 5–7, the motor 63 is energized to rotate the shaft 64 and by means of the eccentrically driven arm 71, the hopper 10 is oscillated in the direction of the double arrow B of FIG. 6. The natural frequency of vibration for the arm and hopper may be obtained by means of the adjusting screws 76 which adjust the compression of the damping springs 75. As the hopper is driven by the arm 73, the rollers 60 ride along within the arcuate recess 61 to oscillate the hopper along an endless curvilinear path lying along a segment of the arcuate recess similar to the embodiment of FIGS. 1–4.

As shown in FIG. 5 the extremes of the path swept by the rollers 60 is indicated by the dotted line roller position. Adjustable means have been provided by which the segmental path along the recess 61 may be predetermined to vary the proportion of vertical movement to horizontal movement. This segmental path may be established by adjusting the position of the motor support plate 67 with the adjusting screw 70 when the bolts 68 have been loosened. When the plate 67 is moved, the arm 73 is pivoted carrying with it the hopper 10 positioning the rollers 60 at the desired position on the arcuate supporting grooves 61.

With the novel improvements I described above on material conveying apparatus provided by the invention, discrete material such as machine parts may be conveyed in an aligned, uniform stream at all times even though the material carried in the hopper may vary considerably in weight as the hopper is emptied. The conveying apparatus driving mechanism has been greatly simplified and quick and easy adjustment of the apparatus for various size parts, speed and feeding direction is permitted.

We claim:

1. A material conveying apparatus comprising a material hopper having a helical conveying surface arranged therein, a plurality of supporting elements secured to the hopper radially of the vertical axis thereof, a stationary supporting frame, means on the frame having a bearing surface engaging said elements and supporting said elements for limited oscillating movement in an upwardly facing concavely arcuate path, and an oscillating drive connected to the hopper radially of the vertical axis thereof independently of the said supporting elements for oscillating the bowl and supporting elements through a predetermined segment of said arcuate path.

2. A material conveying apparatus as defined in claim 1 wherein the hopper and drive are adjustable relative to the frame to select the segment of said arcuate path through which oscillating movement takes place.

3. A material conveying apparatus comprising a material hopper, a helical conveying surface disposed within the hopper adjacent the hopper inner wall, said helical surface having a substantially vertical axis of curvature, a supporting frame, oscillating driving means connected radially of the hopper for oscillating the hopper around the helix axis of curvature, a plurality of downwardly depending supporting arms pivotally mounted at their upper end to said frame, and means pivotally connecting said lower end of the arms to the hopper in hopper supporting engagement, said arms being arranged to direct the hopper reciprocally along a portion of a circular path extending upwardly on each side of the lowest point described by the lower ends of the arms.

4. A material conveying apparatus comprising a material hopper having a helical conveying surface arranged therein, a supporting frame, a plurality of downwardly depending supporting links pivotally supported at their upper end on the frame and pivotally connected at circumferentially spaced points to the hopper to support the hopper for oscillation in an upwardly facing concavely arcuate path, a driving motor supported on the frame, a connecting arm secured at one end to the hopper, and an eccentric connection between the arm and the motor for oscillating the hopper through a portion of said arcuate path.

5. A material conveying apparatus comprising a material hopper having a helical conveying surface arranged therein, a supporting frame, a plurality of downwardly depending supporting links pivotally supported at their upper end on the frame and pivotally connected at circumferentially spaced points to the hopper to support the hopper for oscillation in an upwardly facing concavely arcuate path, a driving motor supported on the frame, a connecting arm secured at one end to the hopper, an eccentric connection between the arm and the motor for oscillating the hopper through a portion of said arcuate path, and means for adjusting the position of the connecting arm relative to the links to select the portion of said arcuate path in which the hopper will oscillate.

6. A material conveying apparatus comprising a material hopper, a helical conveying surface disposed within the hopper adjacent the hopper inner wall, said helical surface having a substantially vertical axis of curvature, a base, eccentric driving means connected radially of the hopper for oscillating the hopper around the helix axis of curvature, a normally fixed rotatable plate supported on said base, a plurality of upstanding posts mounted on the plate, a downwardly depending supporting arm pivotably mounted on each of said posts and having a lower end to which the hopper is pivotally connected in supporting relationship, said arms arranged to support the hopper for oscillation along an upwardly facing arcuate path extending upwardly on each side of the lowest point described by the free end of the arm, and means for rotatably positioning the plate to angularly displace the arms and selectively determine the portion of the arcuate path traversed by the hopper movement.

7. A material conveying apparatus comprising a material hopper having a helical conveying surface arranged therein, a stationary supporting frame having upwardly facing concavely arcuate bearing surfaces spaced about the vertical axis of the hopper, a plurality of rollers secured to the hopper radially of the vertical axis thereof and seated in said bearing surfaces whereby the hopper is supported and guided for movement in an upwardly facing concavely arcuate path about the axis of the hopper, and an eccentric drive connected radially of the vertical axis of the hopper independently of the rollers to oscillate the hopper through a predetermined portion of said arcuate path.

8. A material conveying apparatus comprising a material hopper having a helical conveying surface arranged therein, a stationary supporting frame having upwardly facing concavely arcuate bearing surfaces spaced about the vertical axis of the hopper, a plurality of rollers secured to the hopper radially of the vertical axis thereof and seated in said bearing surfaces whereby the hopper is supported and guided for movement in an upwardly facing concavely arcuate path about the axis of the hopper, a motor supported in the frame, an eccentric drive between the motor and the hopper and connected to the hopper radially outwardly from the vertical axis independently of the rollers to oscillate the hopper through a predetermined portion of said arcuate path, and means to adjust the position of the motor and hopper relative to the frame to vary the portion of said arcuate path traversed by the hopper.

9. A material conveying apparatus comprising a material hopper, a helical conveying surface disposed within the hopper adjacent the hopper inner wall, said helical surface having a substantially vertical axis of curvature, a stationary base, driving means connected to the hopper radially of the vertical axis thereof for oscillating said hopper around said axis of curvature, a plurality of upstanding posts on said base, each of said posts having an upwardly facing concave bearing surface along the upper edge thereof, a plurality of marginally spaced rollers on the hopper independent of said driving means and each arranged to engage one of the said bearing surfaces in hopper supporting engagement whereby the rollers may move along a predetermined portion of the curvilinear path defined by the bearing surfaces during each of said hopper oscillations, and means resiliently loading the rollers into contact with the bearing surfaces.

10. A material conveying apparatus comprising a material hopper, a helical conveying surface disposed within the hopper adjacent the hopper inner wall, said helical surface having a substantially vertical axis of curvature, a stationary base, driving means fixedly connected to the hopper radially of the vertical axis thereof for oscillating the hopper around the helix axis of curvature, a plurality of upstanding posts on said base, each of said posts having an upwardly opening arcuate recess along the upper edge thereof, a plurality of marginally spaced rollers independent of said driving means secured to said hopper radially of the vetrical axis thereof and each arranged to engage one of said arcuate recesses in hopper supporting engagement, whereby the rollers oscillate along a predetermined portion of a curvilinear path defined by the arcuate recesses during each of said hopper oscillations, means to resiliently load the rollers into contact with the recesses, and means connected to said driving means to adjust the angular position of the hopper relative to the base and selectively determine the portion of the arcuate recesses on which the rollers will travel.

11. A material conveying apparatus comprising a material hopper, a helical conveying surface disposed with the hopper adjacent the hopper inner wall, said helical surface having a substantially vertical axis of curvature, a stationary base, a radially extending arm fixedly connected to said hopper, driving means connected to the arm for oscillating the hopper around the helix axis of curvature, a plurality of upwardly facing concavely arcuate bearings on the base, a plurality of marginally spaced rollers independent of the driving means and secured to said hopper radially of the vertical axis thereof and each arranged to engage one of said bearings in hopper supporting engagement whereby the rollers move along a predetermined portion of a curvilinear path defined by the arcuate bearings during each of said hopper oscillations, means to resiliently load the rollers into contact with the bearings, means to move the driving means to adjust the angular position of the hopper relative to the base and selectively determine the portion of the arcuate bearings on which the rollers will travel, and damping springs connected to the driving means and adjustable to select the natural period of vibration of said connecting arm.

References Cited in the file of this patent

UNITED STATES PATENTS

| | | |
|---|---|---|
| 2,637,437 | Jacobsen | May 5, 1953 |
| 2,657,789 | Somogyi | Nov. 3, 1953 |
| 2,821,292 | Spurlin | Jan. 28, 1958 |

FOREIGN PATENTS

| | | |
|---|---|---|
| 279,119 | Great Britain | of 1929 |